United States Patent [19]

Kuga et al.

[11] Patent Number: 5,079,701
[45] Date of Patent: Jan. 7, 1992

[54] SYSTEM FOR REGISTERING NEW WORDS BY USING LINGUISTICALLY COMPARABLE REFERENCE WORDS

[75] Inventors: Shigeki Kuga, Nara; Taro Morishita, Kyoto; Masahiro Wada, Nara; Hiroyuki Kanza, Kyoto, all of Japan

[73] Assignee: Sharp Kabushiki Kaisha, Osaka, Japan

[21] Appl. No.: 604,331

[22] Filed: Oct. 25, 1990

Related U.S. Application Data

[63] Continuation of Ser. No. 249,835, Sep. 27, 1988, abandoned.

[30] Foreign Application Priority Data

Sep. 29, 1987 [JP] Japan ................................ 62-244745

[51] Int. Cl.⁵ ...................... G06F 15/21; G06F 15/38
[52] U.S. Cl. .................................................. 364/419
[58] Field of Search ............ 364/419, 200, 900, 226.4, 364/920.4; 400/110

[56] References Cited

U.S. PATENT DOCUMENTS

| | | | |
|---|---|---|---|
| 4,193,119 | 3/1980 | Arase et al. | 364/900 |
| 4,484,305 | 11/1984 | Ho | 364/900 |
| 4,544,276 | 10/1985 | Horodeck | 364/900 |
| 4,777,600 | 10/1988 | Saito et al. | 364/419 |

FOREIGN PATENT DOCUMENTS

| | | | |
|---|---|---|---|
| 0097818 | 1/1984 | European Pat. Off. | 364/419 |
| 0180888 | 5/1986 | European Pat. Off. | |
| 0045536 | 3/1984 | Japan . | |
| 0103136 | 10/1984 | Japan . | |
| 0200329 | 11/1984 | Japan . | |
| 0055468 | 3/1985 | Japan . | |
| 0090270 | 5/1986 | Japan . | |

*Primary Examiner*—Clark A. Jablon

[57] ABSTRACT

A computer, in particular a word processor, is structured to enter and store Japanese symbols and character strings. The word processor includes an operator defined dictionary. To enter the new words in particular Japanese words into the operator defined dictionary, reference familiar to the operator are displayed. The reference words which are similar in linguistic form to the new words, have parts of speech which are prestored in a dictionary of the word processor. The operator obtains the parts of speech of the reference words which are comparable to the new words. Thereafter, the new words with identified parts of speech in proper form are entered into the operator defined dictionary.

10 Claims, 3 Drawing Sheets

Fig. 3
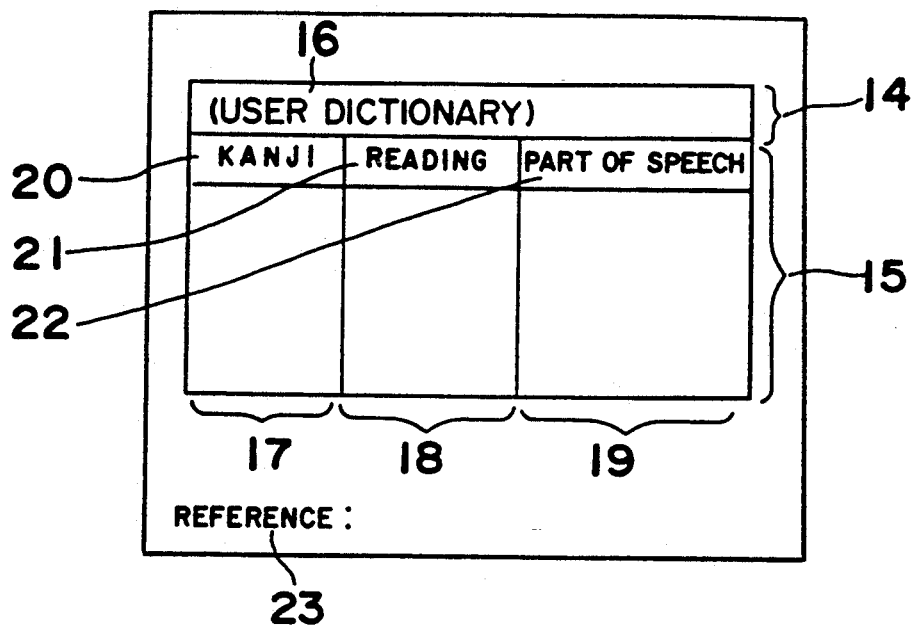
Fig. 4
Fig. 5
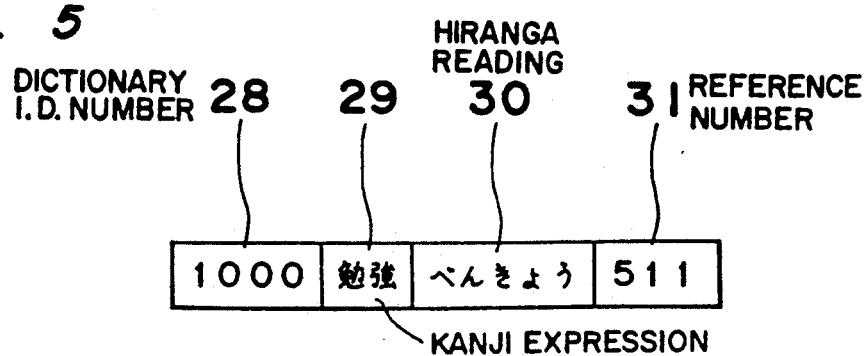

SYSTEM FOR REGISTERING NEW WORDS BY USING LINGUISTICALLY COMPARABLE REFERENCE WORDS

This application is a continuation of application Ser. No. 07/249,835 filed on Sept. 27, 1988, now abandoned.

TECHNICAL FIELD OF THE INVENTION

The present invention relates to a computer, in particular a word processor which produces documents by correcting errors and/or unsuitable expressions from Japanese sentences, presenting prompts and revision information, and providing the vocabulary and other information required for correct document production.

DESCRIPTION OF THE PRIOR ART

Japanese language word processors, hereinafter referred to as word processors, are in wide practical use today, and basic related technologies, including Japanese language input and output, editing, kana-kanji conversion algorithms, and dictionary technologies, are known.

Kana-kanji conversion word processors require a dictionary for conversion, and user dictionary technologies enabling the user to enter discrete user words are known.

Furthermore, basic Japanese linguistic processing technologies, including morpheme analysis, grammatical analysis, and semantic analysis, are known.

In Europe and North America, word processors came into common use earlier than word processors for the Japanese language from an early date, for that reason related technologies are advanced, and devices equipped with spelling check and correction functions are in practical use. While words in Western languages are written and punctuated in word units, Japanese is commonly written in unpunctuated mixed strings of kanji and kana. In addition, as firm correct writing rules are not established in Japanese, analysis is therefore difficult and devices which automate text correction are not available.

Conventionally, when the use of precise Japanese is required, two people read the text together and eliminate problem areas, or a person or persons with special knowledge of text editing successively check and correct the text.

Devices to assist such editing tasks have recently being developed. These devices can be broadly classified into the following two methods.

The first method corresponds to the former editing method, and is a correction device in which mixed kana-kanji sentences are analyzed and converted to audio, and the text is read with the machine via the audio.

The other method which has been proposed, corresponds to the latter editing method, the object of which is to automate editing or to provide specialized editing support. As such a device requires more advanced technology than the former device, there are only proposals of concepts but no reports of means composing said device or specific means of editing. A device according to the present invention is related to the latter method.

The prior art has heretofore described focuses on linguistic processing. Other than the aforementioned technologies, technologies related to work stations are known, and devices using multiple windows to increase work efficiency are in use.

Japanese language word processors have become common in recent years, and documents produced on these devices are increasing in number. The number of word processor models using simple kana-kanji conversion methods (hereafter including Roman character-kanji conversion unless otherwise stated is increasing.

Kana-kanji conversion algorithms generally use linguistic information such as word dictionaries and grammar, and probability information such as the frequency of appearance of a word in the process of converting kana to kanji.

With respect to word dictionaries, user dictionaries which the user can define, enter, and use are also known in addition to general dictionaries. The words used differ according to the field in which the device is used and/or to different requirements of the user.

Most conventional user dictionaries in word processors register kana and kanji pairs, but were deficient in that parts of speech and other information could not be entered into the word processor.

In some user dictionaries which are more advanced, the user does not specifically register part of speech information, but the device automatically assigns the most common part of speech, such as noun or noun followed by "suru" inflections (noun followed by the s series irregular conjugation or having inflections of letter "s" combined with vowels). In this case, the problem arose that the part of speech information was not always correct because it was automated. The part of speech information other than that automatically assigned by the word processor could not be entered in the user dictionary.

As a result, of the problem stated, that character strings may appear for which kana-kanji conversion is not possible.

Furthermore, in kana-kanji conversion devices based on phrase unit input, the result was that phrases containing combinations of user-registered words and standard words could not be converted when the conversion was attempted.

To avoid these deficiencies, when the user sought to convert character strings which the user could not register, the user was compelled in each instance to convert individual characters using the kanji dictionary function.

There was also the problem that input conversion must be executed while determining whether the word was entered in the user dictionary or the general dictionary.

In addition to kana-kanji conversion input of phrase units, kana-kanji conversion input of consecutive phrases and automatic batch conversion methods have been developed, but in these methods, too, because part of speech and other information cannot be added, user-entered words cannot be effectively utilized in kana-kanji conversion processing.

Even if part of speech and other information could be added to user-registered words, problems such as the following would occur.

One, is that user-entered words require the same linguistic information as that of the general dictionary, and it is in actual practice hard for the average user to add detailed linguistic information.

Secondly, the information in the dictionary in the device is encoded, and is not in a form which the user can generally read. Therefore, in order to add part of speech and other information, an interactive function and a mechanism to convert the obtained information to the internal format are required.

SUMMARY OF THE INVENTION

The present invention has been developed with a view to substantially eliminating the above described problems inherent in conventional systems, and has for its essential object to provide a word processor which is capable of adding sufficient information to user-entered words by obtaining part of speech and other information from reference word information familiar to the user.

To accomplish this and other objects, the document generator and correction support device according to the present invention includes with a means of entering and editing Japanese. Also there are separate means for storing the entered Japanese, for entering a dictionary defined by a user, and for storing the dictionary. Further, there are means of storing grammar. A control means is provided such as a microprocessor which converts and edits the entered kana character strings to mixed kana-kanji sentences. A means is used for displaying character and symbol strings, and when there are character and symbol strings which should be corrected, a means is used for revising the character and symbol strings.

When Japanese kana character strings entered into a computer or similar device by an input means are entered through the kana-kanji conversion method, a conversion dictionary is referenced when the kana is converted to kanji. A device according to the present invention fetches the required information from a kana-kanji conversion dictionary and uses this for a dictionary of the device by kana-kanji converting a known word which functions in a grammatically similar manner when registering a dictionary for document generation and correction.

Information contained in the device is displayed so that it can be understood by the user, and the device operates so that if there is a mistake revisions are possible.

Furthermore, the device operates in a manner such that a check or confirmation can be made whether or not the entered dictionary operates correctly in the device. With a confirmation a check can be made whether or not the dictionary entered task was executed correctly can be determined overall.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numbers, and, wherein;

FIG. 3 is a view showing the display in a user dictionary mode;

FIG. 4 is a view showing information of a user-entered entry;

FIG. 5 is a view showing the internal typing of a dictionary used for kana-kanji conversion.

DETAILED DESCRIPTION OF THE PREFERRED EMBODIMENT

Figure 1:
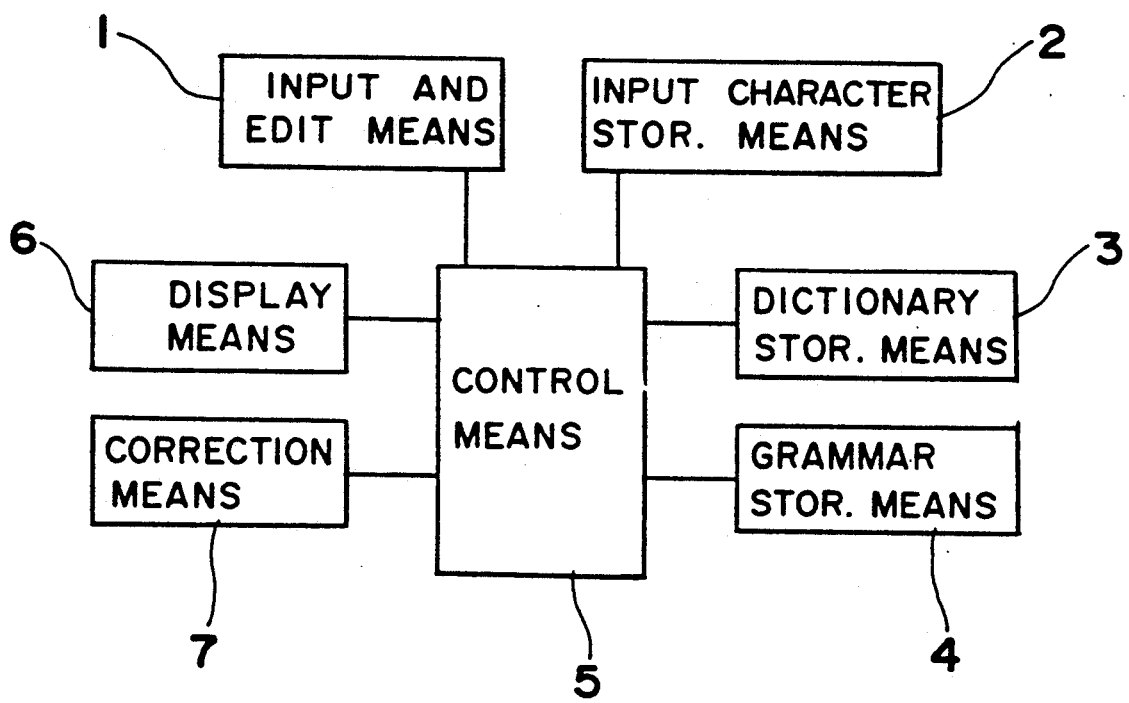
FIG. 1 is a structural block diagram of a word processor device according to one preferred embodiment of the present invention.

FIG. 1 is a block diagram of a word processor according to one preferred embodiment of the present invention.

In the figure, reference number 1 is a means for inputting and editing Japanese. A kana-kanji conversion function which changes kana to kanji and is known is included in this means. Reference, number 2 is a means for storing the Japanese character strings entered by the input means 1. A keyboard is generally used for the input means 1, but it is also possible to substitute an external storage means which stores the input Japanese character strings on a floppy disk, magnetic tape, or similar medium, without successively entering characters. In other words, a construction in which the input means 1 is omitted is also possible.

Reference number 3 is a means of storing a dictionary for morpheme analysis of Japanese character and symbol strings accumulated in the means 2. Reference number 4 is used for the same objective, and is a means of storing grammar and other dictionaries. Reference number 5 is a control means, for example, a microprocessor for extracting part of a character string stored in the means 2, for storing intermediate results, and for executing display commands. The control means 5 includes a means of storing the results obtained from the control action.

Reference number 6 is a cathode-ray tube or other display means for displaying input character strings, intermediate reference results, and character strings or KWIC which should be corrected.

Reference number 7 is a correction means for correctly reflecting in the original text the results of revisions added to the parts which should be corrected and were displayed by the display means 6.

The present invention relates to a word processor device, but because it has no direct relationship to the generation and correction function, the description is herein limited to the block diagram only.

Figure 2:
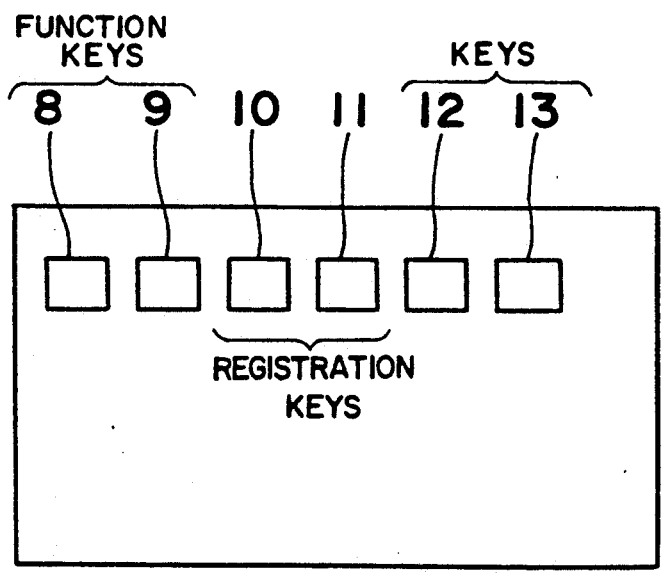
FIG. 2 is a view describing in detail an input means in FIG. 1.

FIG. 2 shows a device related to the present invention. These functions can be realized using part of the functions of the input means. Reference number 8 is a function key for switching the processing of the device to the mode operating the user dictionary used for correction and reference number 9 is another function key for escaping from this mode. These can be achieved by assigning one of the input means 1. Furthermore, these function keys 8 and 9 can be used in common, and can be set by control means 5 so that when the function key 8 is pressed once, the registration mode is entered, and when it is pressed again, the registration mode can be exited. Furthermore, it is also possible to set the key 8 to that modes other than the registration mode can be accessed in combination with other keys. Reference number 10 is a key to start registration or entering with a reference word. This can also assign one of the input means 1. Reference number 11 is a key to register or enter the specified information in the user dictionary, and reference number 12 is a key to delete the entered dictionary. Furthermore, reference number 13 is a key used to add information with reference registration after entering the user dictionary operation mode. This can, for example, be substituted by a function key for converting the reference word. There is no particular significance to the series of keys 8 to 13 in FIG. 2, and the present invention is not dependent upon this order.

Furthermore, reference numbers 8 to 13 were described herein as special keys, but the implementation shall not be limited to keys, and can be substituted with conventional input keys in the input means by providing such with the meaning herein defined.

FIG. 3 is an example of a display in the part of speech registration stage in the user dictionary registration mode. Reference number 14 is an area in which are displayed prompts showing the mode or other information, and reference number 15 is an area displaying the contents of the user dictionary. Reference number 16 is an example showing the processing mode, and reference numbers 17, 18, and 19 are areas displaying such information (hereinafter abbreviated at times as part of speech information) as the kanji, reading, and part of speech, respectively, of the user registered entry. In each of these areas would normally be entered an identification of the area such as 20, 21, and 22. Reference number 23 is a symbol prompting input of the reference word, and in this figure the device is in the reference registration mode and ready to receive input of the reference word from the user.

FIG. 4 shows an example in which the reference word "benkyoo" is input, and the new word "tabako suru" is being registered. Reference number 24 shows the (katakana) entry "tabako" to be input to the kanji position of the registered entry, reference number 25 is the (hiragana) "tabako" to be input to the reading position, reference number 26 shows the part of speech information "noun followed by " suru "inflections, compoundable, common noun," and at reference number 27 is the reference word "benkyoo" (in kanji).

FIG. 5 shows an example of the internal typing of the reference word "benkyoo". Reference number 28 is the dictionary entry identification number, reference number 29 is the kanji expression "benkyoo", reference number 30 is the dictionary (hiragana) reading "benkyoo", and reference number 31 is the encoded representation of the part of speech information (noun followed by "suru" inflections, compoundable, common noun}. In this example, 5 signifies a noun followed by "suru" inflections, the middle 1 signifies that the word can be compounded, and the 1 on the right end signified that the word is a common noun. This information is usually encoded, and frequently helps to conserve memory. Providing a corresponding table of codes and restored expressions is sufficient to restore the encoded information to an easy-to-understand form. For example, the noun 5 followed by "suru" inflections would be changed to "sahen", the compoundable 1 to "fukuka", and the common noun 1 to "fumei". Furthermore, there are times when the ID number is not used during user dictionary registration processing, and it may be omitted.

Figure 6:
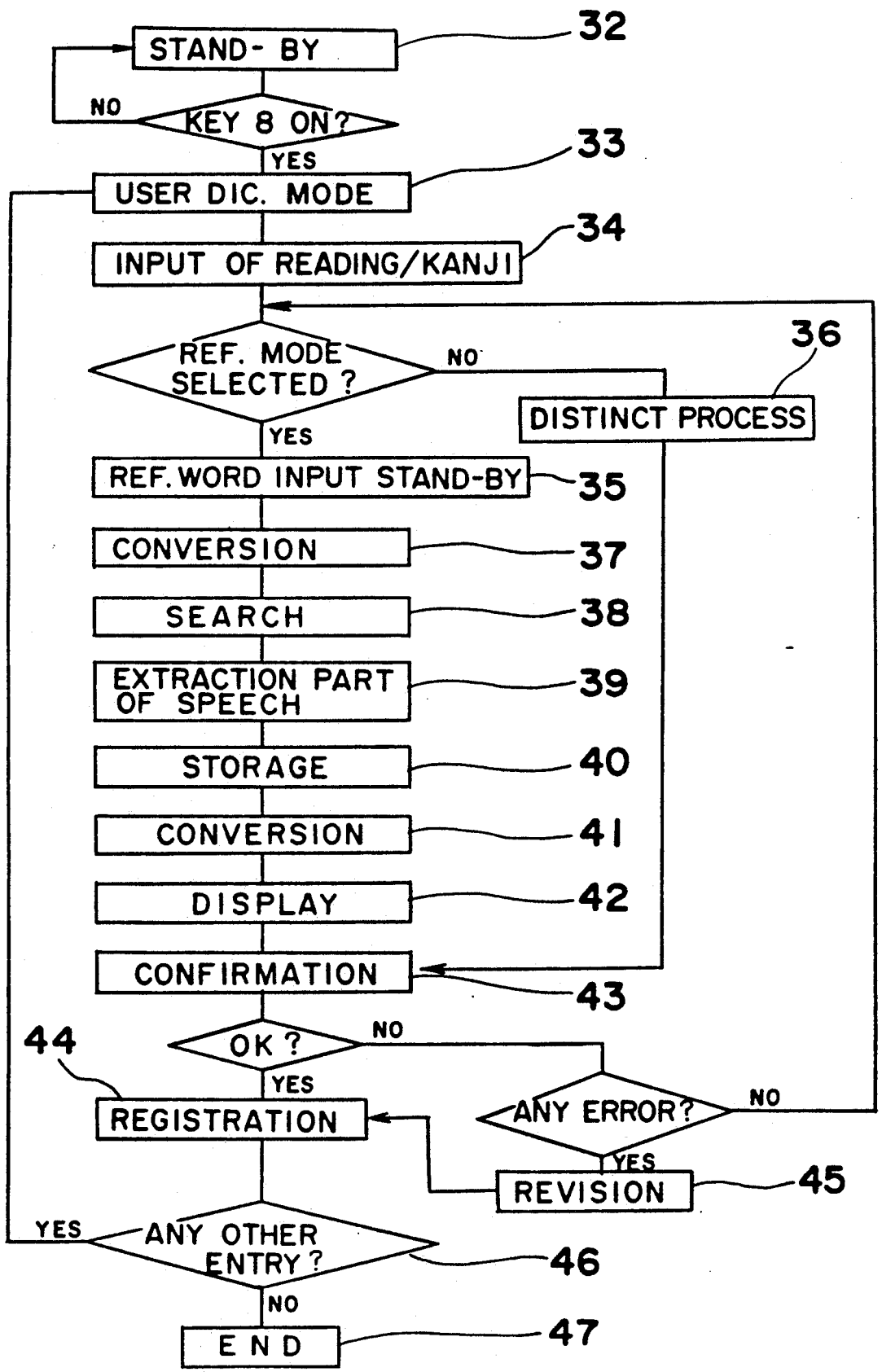
FIG. 6 is a flow-chart showing the processing executed in the device of the present invention.

FIG. 6 is a summary flow chart of the present invention. Registration of "tabako suru" is used as the example for the description. First, the correction processing mode is set to the user dictionary mode. This is accomplished with key 8. This shall be designated processing block 32. With this processing, it is indicated that the device has entered the user dictionary mode, and the display will be a blank form such as shown in FIG. 3. This user-registration initial processing block shall be designated 33.

Next, the characters for "tabako" (katakana) and "tabako" (hiragana) are entered, respectively, in the kanji and reading areas using kana-kanji conversion input. This processing block shall be designated 34.

Next, if the reference registration key 10 is pressed at this point, prompt 23 will be displayed, and the reference word input standby status will be assumed. This shall be designated processing block 35. At this point, the flow is shown to proceed to 34 and 35, but the order may also be 35 to 34. In this case, the display status in FIG. 3 will be assumed at 35, and 34 will come next.

Furthermore, if the reference registration key is not pressed, a different registration method will be entered, but as this is beyond the scope of the present invention, this shall be designated distinct processing block 36 and will not be herein described.

When reference registration is commenced, the reference word is entered next. In this case, using the kana-kanji conversion method, "benkyoo" (hiragana) is input, and when the conversion key is pressed "benkyoo" (kanji) is output. This shall be designated reference word conversion processing block 37.

At the next processing block the reference word is searched in the kana-kanji conversion dictionary. This is accomplished by comparing the displayed character string with the dictionary entries. This processing shall be designated 38.

Next, it is necessary to pull the information required for parts of speech from the dictionary for kana-kanji conversion. It is easy to extract the part of speech information only because the dictionary structure is predetermined at the design stage. This processing block shall be designated 39.

The extracted information is temporarily stored in the stack of the control device. This processing block shall be designated 40.

Next, the stacked information is analyzed, the correspondence table is referenced, and the information is converted to a form which is easy to display. This processing block shall be designated 41.

Next, the converted information is displayed in the part of speech frame. The technology of displaying information in a fixed position is common. This processing block shall be designated 42.

Next, it is confirmed whether or not there is a mistake in the information entered using the characters and the reference word entered at this time. The processing block for this confirmation shall be designated 43.

If there are no errors, the entry is registered as a dictionary for corrections by pressing registration execute key 11. This processing block shall be designated 44. If mistakes are recognized, there are two processes. One is when there is an error in the entry kanji and the reading; in this case, the cursor is aligned with the part of the kanji or reading whichever is wrong, and revision is made. This processing block shall be designated 45.

The other error is a mistake in the part of speech or other information; in this case, the procedure returns to step 33 and processing is repeated until there are no errors.

When a new entry is correctly registered in the user dictionary, it is decided to register the next entry with the same procedure, to delete, or to escape from the user dictionary mode. This processing block shall be designated 46.

Reference number 47 is the termination processing block for the user dictionary processing mode.

One result of the present invention is that entry readings, kanji expression information, and other information such as parts of speech can be registered regardless of the amount of information with an easy operation.

In additional result is that correct correction processing can occur because accurate information can be added even to user-registered entries.

Furthermore, in a device according to the present invention, because the contents of a user-registered dictionary can be displayed in a form which is easily understood by the human operator, the invention is effective in enabling easy confirmation.

Moreover, while a person versed in linguistics is normally required for dictionary registration of this nature, a device according to the present invention is effective in enabling even people with little knowledge of linguistics to produce a dictionary with good and accurate precision.

Furthermore, because cumbersome dictionary registration can be accomplished overall with an easy operation, a device according to the present invention is effective in reducing work time, reducing mistakes, and increasing work efficiency.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An electronic apparatus for entering new Japanese words into an operator defined dictionary so that the linguistic information of the new words can be related to linguistic information of known reference words to enable the new words to be in proper linguistic form when entered in the dictionary comprising:

a display for displaying the new Japanese words in different modes;

means for entering and displaying reference words which are similar in linguistic form to the new Japanese words;

means for converting said reference words from a first mode to a second mode;

means for identifying and displaying parts of speech of the reference words; and means for registering the new Japanese words by entering them along with parts of speech related to the known entered reference words into the operated defined dictionary.

2. The apparatus of claim 1 wherein said parts of speech is selected from the group consisting of nouns and noun inflections.

3. The apparatus of claim 1 wherein said means for registering includes a key.

4. A method of entering a new Japanese word into an operator defined computer dictionary comprising the steps of:

(a) identifying said new word;

(b) displaying said new word in different modes;

(c) entering a reference word related in linguistic form to said new word;

(d) converting the reference word from a first to second mode; and (e) obtaining parts of speech of the new word from a prestored dictionary.

5. A method of claim 4 further including the step of:

(f) entering the new word in the operator's dictionary after step (e).

6. The method of claim 4 wherein the new word has parts of speech related to the reference word.

7. A word processing device for producing documents in the Japanese language and that has the capability of entering new Japanese words into an operator defined dictionary so that the linguistic information of the new words is related to prestored linguistic information of entered reference words in the apparatus in order that the new word when entered into the dictionary will be in proper linguistic form comprising:

means for identifying said new Japanese words in different modes;

means for entering the reference words which are similar in linguistic form to the new words;

means for obtaining parts of speech of the reference word from a prestored dictionary; and means for registering said new words along with its parts of speech relates to the reference words into the operator defined dictionary.

8. The apparatus of claim 7 wherein said parts of speech including different parts of speech.

9. The apparatus of claim 8 wherein the parts of speech is selected from the group consisting of nouns and noun inflections.

10. The apparatus of claim 7 wherein said means for entering includes a key.

* * * * *